US012278589B2

United States Patent
Wang

(10) Patent No.: US 12,278,589 B2
(45) Date of Patent: Apr. 15, 2025

(54) CONTROL METHOD AND CONTROL APPARATUS OF PERMANENT MAGNET GENERATOR

(71) Applicant: BEIJING GOLDWIND SCIENCE & CREATION WINDPOWER EQUIPMENT CO., LTD., Beijing (CN)

(72) Inventor: Jinpeng Wang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 190 days.

(21) Appl. No.: 18/256,569

(22) PCT Filed: Jun. 8, 2021

(86) PCT No.: PCT/CN2021/098784
§ 371 (c)(1),
(2) Date: Jun. 8, 2023

(87) PCT Pub. No.: WO2022/121261
PCT Pub. Date: Jun. 16, 2022

(65) Prior Publication Data
US 2024/0022190 A1    Jan. 18, 2024

(30) Foreign Application Priority Data
Dec. 8, 2020  (CN) .......................... 202011445072.9

(51) Int. Cl.
    *H02P 9/02*       (2006.01)
    *H02P 101/15*   (2016.01)
(52) U.S. Cl.
    CPC ............ *H02P 9/02* (2013.01); *H02P 2101/15* (2015.01)

(58) Field of Classification Search
CPC .. H02P 21/14; H02P 9/44; H02P 21/22; H02P 21/24
(Continued)

(56) References Cited

U.S. PATENT DOCUMENTS

2005/0151377 A1*  7/2005  Ichinose ................... H02P 9/10
                                                                  290/44
2008/0143111 A1*  6/2008  Ichinose ................. F03D 9/255
                                                                  290/55
(Continued)

FOREIGN PATENT DOCUMENTS

CN    102594250 A    7/2012
CN    103107757 B    5/2015
(Continued)

OTHER PUBLICATIONS

Kang Jinsong, et al; "Newton-Raphson-Based Searching Method for Variable-Parameters Inductance Maximum Torque Per Ampere Control Used for IPMSM", Transactions of China Electrotechnical Society; vol. 34, No. 8, Apr. 2019; 11 pages.

(Continued)

*Primary Examiner* — Charles Reid, Jr.

(57) ABSTRACT

A control method and a control apparatus of a permanent magnet generator are provided, the control method includes: determining an active current reference initial value and a reactive current reference initial value of the permanent magnet generator in a current control period; searching, based on the active current reference initial value and the reactive current reference initial value, and with a target of maximizing a torque-current ratio in the current control period, an optimal active current reference value and an optimal reactive current reference value in the current control period; controlling, based on the optimal active current reference value and the optimal reactive current reference value, the permanent magnet generator to operate; in which (Continued)

the torque-current ratio is calculated based on a torque command value received by the permanent magnet generator from a wind turbine main controller and an output current value of the permanent magnet generator.

13 Claims, 2 Drawing Sheets

(58) Field of Classification Search
USPC .................. 322/7, 14, 17, 44; 290/44, 55
See application file for complete search history.

(56) References Cited

U.S. PATENT DOCUMENTS

| | | | |
|---|---|---|---|
| 2009/0267550 A1 | 10/2009 | Hida et al. | |
| 2015/0137518 A1* | 5/2015 | Yin | H02J 3/381 290/44 |
| 2015/0365031 A1* | 12/2015 | Wessels | H02J 3/18 290/44 |
| 2019/0148949 A1* | 5/2019 | Biris | F03D 7/0284 290/44 |
| 2020/0358389 A1 | 11/2020 | Yoo | |

FOREIGN PATENT DOCUMENTS

| | | |
|---|---|---|
| CN | 107592052 A | 1/2018 |
| CN | 108880368 A | 11/2018 |
| CN | 111082730 A | 4/2020 |
| CN | 111628690 A | 9/2020 |

OTHER PUBLICATIONS

The International Search Report mailed Aug. 30, 2021; PCT/CN2021/098784.
Wei Xie, et al; "Dynamic Loss Minimization of Finite Control Set-Model Predictive Torque Control for Electric Drive System", IEEE Transactions on Power Electronics, vol. 31, No. 1, Jan. 2016; 12 pages.
J. Wang, et al.; "Power Perturbation based Virtual Signal Injection Control of MTPA for IPMSM Drive System", Published in XIII International Conference on Electrical Machines (ICEM); Oct. 25, 2018; 6 pages.
Jun-Ichi Itoh, et al.; "Stabilization Method Using Equivalent Resistance Gain Based on V/f Control for IPMSM with Long Electrical Time Constant", Published in: 2018 International Power Electronics Conference (IPEC-Niigata 2018-ECCE Asia); Oct. 25, 2018; 8 pages.
The Extended European Search Report dated Apr. 23, 2024; Appln. No. 21901974.2.

* cited by examiner

CONTROL METHOD AND CONTROL APPARATUS OF PERMANENT MAGNET GENERATOR

CROSS-REFERENCE TO RELATED APPLICATION

This application is a National Stage of International Patent Application No. PCT/CN2021/098784, filed 8 Jun. 2021, which claims priority to and the benefit of Chinese Patent Application No. 202011445072.9, filed 8 Dec. 2020, the entireties of which are hereby incorporated herein by reference.

TECHNICAL FIELD

The present disclosure generally relates to a technical field of wind power generation, and more particularly to a control method and a control apparatus of a permanent magnet generator.

BACKGROUND

At present, under a condition that a permanent magnet generator is a salient pole generator or a non-salient pole generator with weak salient pole characteristics, a maximum output torque under per unit current may be achieved by utilizing the salient pole characteristics, and an optimal control current may be acquired by using a maximum torque per ampere algorithm.

However, in the method described above, accuracy of a calculated active current reference value and a calculated reactive current reference value is affected by accuracy of parameters of the permanent magnet generator, and the parameters of the permanent magnet generator change on a real-time basis due to an effect of the operating environment temperature and current value variations during the operation of the generator, so that there is a greater control deviation in the method of calculating the active current reference value and the reactive current reference value according to the parameters of the permanent magnet generator, and thus it is impossible to achieve optimal torque per ampere control.

SUMMARY

The present disclosure provides a control method and a control apparatus of a permanent magnet generator.

According to an aspect of an exemplary embodiment of the present disclosure, a control method of a permanent magnet generator is provided, in which the control method includes: determining an active current reference initial value and a reactive current reference initial value of the permanent magnet generator in the current control period; searching, based on the active current reference initial value and the reactive current reference initial value, and with a target of maximizing a torque-current ratio in the current control period, an optimal active current reference value and an optimal reactive current reference value in the current control period; controlling, based on the optimal active current reference value and the optimal reactive current reference value, the permanent magnet generator to operate; in which the torque-current ratio is calculated based on a torque command value received by the permanent magnet generator from a wind turbine main controller and an output current value of the permanent magnet generator.

According to another aspect of an exemplary embodiment of the present disclosure, a control apparatus of a permanent magnet generator is provided, in which the control apparatus includes: an initial value determination unit configured to determine an active current reference initial value and a reactive current reference initial value of the permanent magnet generator in the current control period; a search unit configured to search, based on the active current reference initial value and the reactive current reference initial value, and with a target of maximizing a torque-current ratio in the current control period, an optimal active current reference value and an optimal reactive current reference value in the current control period; and a control unit configured to control, based on the optimal active current reference value and the optimal reactive current reference value, the permanent magnet generator to operate; in which the torque-current ratio is calculated based on a torque command value received by the permanent magnet generator from a wind turbine main controller and an output current value of the permanent magnet generator.

According to yet another aspect of an exemplary embodiment of the present disclosure, a computer-readable storage medium storing computer programs is provided, in which the computer programs, when executed by a processor, implement the control method of the permanent magnet generator of the present disclosure.

According to yet another aspect of an exemplary embodiment of the present disclosure, an electronic device is provided, and the electronic device includes at least one processor, at least one memory storing computer-executable instructions, in which the computer-executable instructions, when executed by the at least one processor, cause the at least one processor to perform the control method of the permanent magnet generator of the present disclosure.

A part of additional aspects and/or advantages of the general concept of the present disclosure will be set forth in the following description, and other part of additional aspects and/or advantages of the general concept of the present disclosure will be obvious from the description, or may be learned by implementation of the general concept of the present disclosure.

BRIEF DESCRIPTION OF THE DRAWINGS

These and/or other aspects and advantages of the present disclosure will become apparent from reading the following description of embodiments with reference to the accompanying drawings.

DETAILED DESCRIPTION

Features and exemplary embodiments of various aspects of the present disclosure will be described in detail below. To make the objects, technical solutions and advantages of the present disclosure clearer, the present disclosure will be further described in detail below with reference to the accompanying drawings and specific embodiments. It is understood that the specific embodiments described herein are merely intended to explain the present disclosure, rather than to limit the present disclosure. For those skilled in the art, the present disclosure can be implemented without some of these specific details. The following description of the embodiments is merely to provide a better understanding of the present disclosure by illustrating the examples of the present disclosure.

At present, accuracy of an active current reference and a reactive current reference calculated by using a maximum torque per ampere (MTPA) algorithm is affected by accuracy of parameters of the permanent magnet generator, and the parameters of the permanent magnet generator change on a real-time basis due to an effect of the operating environment temperature and current value variations during the operation of the generator, so that there is a greater control deviation in the active current reference value and the reactive current reference value calculated according to the parameters of the generator, and thus it is impossible to achieve optimal torque per ampere control.

Accordingly, it is possible to solve the above problem from the perspective of reducing or even eliminating an effect of the accuracy of the parameters of the permanent magnet generator on the accuracy of conventional optimal torque per ampere control.

According to an embodiment of the present disclosure, a method combining on-line search and the maximum torque per ampere (MTPA) algorithm is provided, that is, the active current reference and the reactive current reference are calculated by a MTPA formula, and then a real-time search is performed based on values calculated by the formula and with a searching target of maximizing the torque-current ratio, so as to correct a formula-calculated value error caused by a parameter deviation, thereby achieving precise optimal torque per ampere control.

Figure 1:
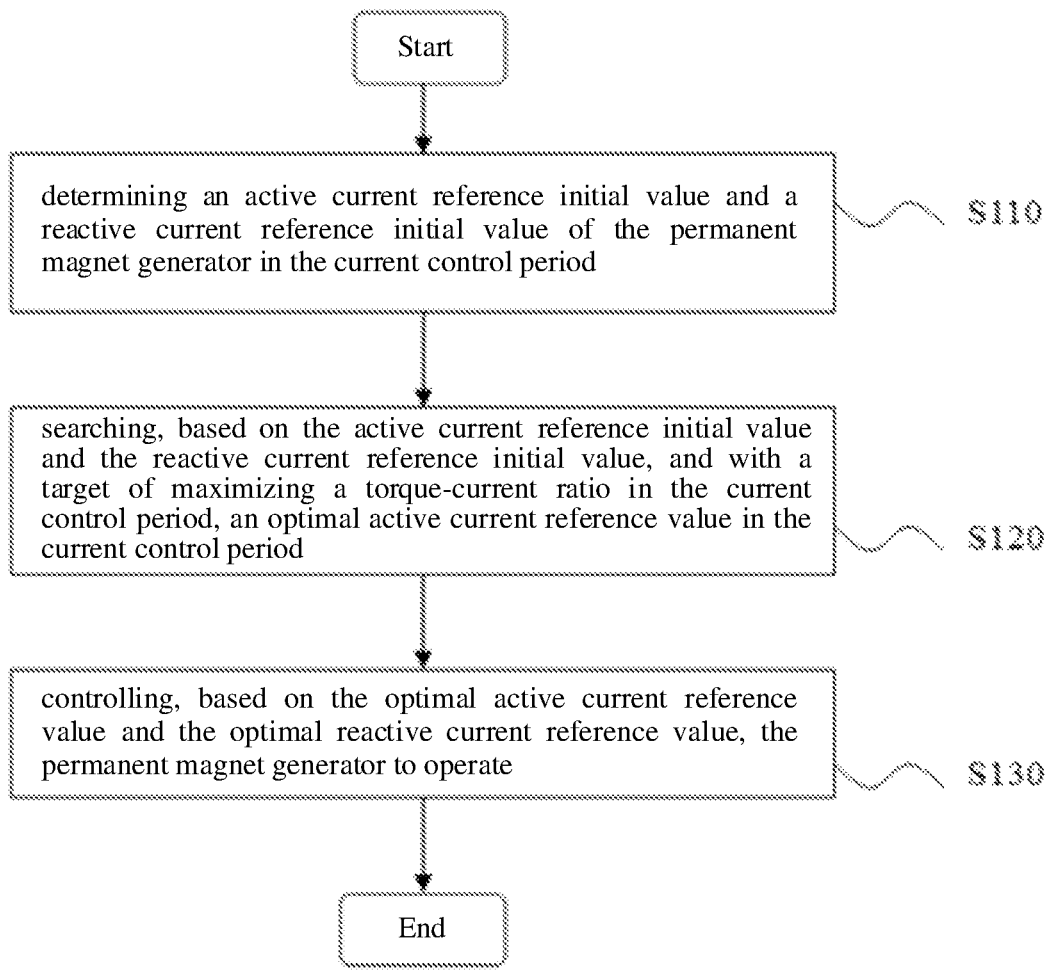
FIG. 1 is a flowchart showing a control method of a permanent magnet generator according to an exemplary embodiment of the present disclosure.

FIG. 1 is a flowchart showing a control method of a permanent magnet generator according to an exemplary embodiment of the present disclosure. With reference to FIG. 1, the control method of the permanent magnet generator includes steps S110 to S130.

In the step S110, an active current reference initial value and a reactive current reference initial value of the permanent magnet generator in the current control period are determined.

First, it is noted that, the reason why "in the current control period" is defined herein is that since main control instructions (for example, including control parameters, torque command values, and the like) sent by a wind turbine main controller to the permanent magnet generator change in different control periods, corresponding active current reference initial values and corresponding reactive current reference initial values calculated according to the different control periods may be different. Based on this, "determined" involved in the step S110 and corresponding calculations involved in subsequent steps of S120 and S130 are required to be completed "in the current control period".

For the different control periods, searched optimal active current reference values and searched optimal reactive current reference values may be updated according to conditions, which will be described below.

It is appreciated that the step S110 may be implemented in various ways. For example, in an optional implementation, the step S110 may include: acquiring control parameters sent to the permanent magnet generator by the wind turbine main controller in the current control period and generator parameters of the permanent magnet generator; and calculating, based on the generator parameters and the control parameters, the active current reference initial value and the reactive current reference initial value. Herein, the generator parameters include, but are not limited to, a generator flux linkage $\psi_m$, a d-axis inductance $L_d$, and a q-axis inductance $L_q$, and the control parameters include, but are not limited to, a driving current $I_s$.

Further, the active current reference initial value and the reactive current reference initial value may be calculated according to the following way.

For example, with reference to the formula (1), the reactive current reference initial value $i_{dref0}$ may be calculated based on the generator flux linkage $\psi_m$, the d-axis inductance $L_d$, the q-axis inductance $L_q$ and the driving current $I_s$, and the active current reference initial value $i_{qref0}$ may be calculated based on the driving current $I_s$ and the reactive current reference initial value.

$$\begin{cases} i_{dref0} = \dfrac{\varphi_m - \sqrt{\varphi_m^2 + 8(L_q - L_d)^2 I_s^2}}{4(L_q - L_d)} \\ i_{qref0} = \sqrt{I_s^2 - i_d^2} \end{cases} \quad (1)$$

As another example, with reference to the formula (2), a current vector angle $\theta_{MTPA}$, of the permanent magnet generator is calculated based on the generator flux linkage $\psi_m$, the d-axis inductance $L_d$, the q-axis inductance $L_q$ and the driving current $I_s$ by an inverse cosine operation, and the active current reference initial value $i_{qref0}$ and the reactive current reference initial value $i_{dref0}$ are calculated based on the driving current $I_s$ and the current vector angle $\theta_{MTPA}$.

$$\begin{cases} \theta_{MPTA} = \cos^{-1}\left(\dfrac{-\varphi_m + \sqrt{\varphi_m^2 + 8(L_q - L_d)^2 I_s^2}}{4(L_q - L_d) I_s}\right) \\ i_{dref0} = I_s \cos\theta_{MTPA}, \, i_{qref0} = I_s \sin\theta_{MTPA} \end{cases} \quad (2)$$

In the step S120, based on the active current reference initial value and the reactive current reference initial value calculated in the step S110, and with a target of maximizing a torque-current ratio in the current control period, an optimal active current reference value and an optimal reactive current reference value in the current control period are searched.

In the step S130, the permanent magnet generator is controlled to operate based on the optimal active current reference value and the optimal reactive current reference value. Herein, the torque-current ratio is calculated based on the torque command value received by the permanent magnet generator from the wind turbine main controller and an output current value of the permanent magnet generator.

Typically, the step S120 may be implemented in various available ways. For example, in the current control period, the optimal active current reference value and the optimal reactive current reference value are searched on-line by using a hill-climbing method. As another example, in the current control period, the optimal active current reference value and the optimal reactive current reference value are searched off-line by using a table lookup method, a look-up table supporting an off-line search is obtained by performing an on-line search in advance, and the look-up table includes the optimal active current reference values and the optimal reactive current reference values corresponding to different torques, rotational speeds and/or powers.

Optionally, searching the optimal active current reference value and the optimal reactive current reference value online by using the hill-climbing method includes:

Step A: keeping, in the current control period, the active current reference initial value obtained in the step S110 unchanged as the optimal active current reference value; and Step B: searching, based on the reactive current reference initial value obtained in the step S110 and by gradually adding or subtracting a reactive current reference value variation of a preset step size, a reactive current reference value corresponding to a maximum torque-current ratio in the current control period as the optimal reactive current reference value.

Herein, it is noted that in the step A, the formula for torque and active current may be:

torque value=constant*active current value

Based on the formula, in the current control period, only one torque command value is given, the active current reference initial value is a fixed value, and no other calculation is performed, so as to keep the active current reference initial value unchanged, that is, to lock the active current reference initial value $i_{qref0}$.

In the step B, in the current control period, under a condition that the active current reference initial value $i_{qref0}$ do is locked, reference is made to a relationship determined between the driving current $I_s$ and a reactive current reference id in the formula (1), so that output current values of the permanent magnet generator in response to different driving currents $I_s$ are obtained by adjusting the reactive current reference id and changing the driving current Is, and then a plurality of torque-current ratios are calculated based on torque command values corresponding to the current control period, and a maximum torque-current ratio is determined from the plurality of torque-current ratios, thereby determining the optimal reactive current reference value.

According to the condition, in the step B, the reactive current reference value may be searched in the following way.

For example, the reactive current reference initial value $i_{dref0}$ and a reactive current reference value variation ΔI of a preset step size are added, that is, the reactive current reference increases based on the $i_{dref0}$ (adding ΔI), and it is determined that whether a ratio of the torque command value received from the wind turbine main controller to the output current (that is, the torque-current ratio) increases. Under a condition that the torque-current ratio does not increase, the reactive current reference value variation ΔI of the preset step size is subtracted from the reactive current reference initial value $i_{dref0}$, that is, the reactive current reference is reduced based on $i_{dref0}$ (subtracting ΔI), and it is determined whether the torque-current ratio increases after the output current of the permanent magnet generator is stable; and under a condition that the torque-current ratio does not increase, the reactive current reference initial value $i_{dref0}$ is determined as the optimal reactive current reference value in the current control period.

In the process of searching the optimal reactive current reference value, corresponding torque-current ratio do not increase after a forward search (that, adding the reactive current reference initial value $i_{dref0}$ to the reactive current reference value variation ΔI of the preset step size) and a reverse search (that is, subtracting the reactive current reference value variation ΔI of the preset step size from the reactive current reference initial value $i_{dref0}$) are performed based on the reactive current reference initial value $i_{dref0}$, and therefore a corresponding reactive current reference initial value $i_{dref0}$ may be determined as the optimal reactive current reference value.

As another example, under a condition that a calculated torque-current ratio increases after the reactive current reference value $i_{dref0}$ and ΔI are added, ΔI is added based on $i_{dref0}$ ΔI, and a latest reactive current reference value under this condition is $i_{dref0}$ 2ΔI. After the output current of the permanent magnet generator is stable, the torque-current ratio is calculated and it is judged whether the torque-current ratio increases; under a condition that the torque-current ratio does not increase, $i_{dref0}$ 2ΔI is determined as the optimal reactive current reference value; under a condition that the torque-current ratio increases, ΔI is continued to be added based on $i_{dref0}$+2ΔI, and a latest reactive current reference value under this condition is $i_{dref0}$+3 ΔI; and then after a current output by the permanent magnet generator is stable, it is continued to be determined whether the torque-current ratio increases, and so on.

In the process of searching the reactive current reference value, under a condition that the torque-current ratio increases after the forward search is performed based on the reactive current reference initial value $i_{dref0}$, the reactive current reference increases based on $i_{dref0}$, the forward search is continued until the torque-current ratio does not increase, and the reactive current reference value under this condition $i_{dref0}$+nΔI, and n is a certain positive integer) is determined as the optimal reactive current reference value.

As another example, under a condition that the calculated torque-current ratio increases after ΔI is subtracted from the reactive current reference value $i_{dref0}$, ΔI is subtracted based on $i_{dref0}$−ΔI, and a latest reactive current reference value under this condition is $i_{dref0}$−2ΔI. After the output current of the permanent magnet generator is stable, the torque-current ratio is calculated and it is judged whether the torque-current ratio increases; under a condition that the torque-current ratio does not increase, $i_{dref0}$−2ΔI is determined as the optimal reactive current reference value; under a condition that the torque-current ratio increases, ΔI is continued to be subtracted based on $i_{dref0}$−2ΔI, and a latest reactive current reference value under this condition is $i_{dref0}$−3 ΔI; and then after a current output by the permanent magnet generator is stable, it is continued to be determined whether the torque-current ratio increases, and so on.

In the process of searching the reactive current reference value, under a condition that the torque-current ratio increases after the reverse search is performed based on the reactive current reference initial value $i_{dref0}$, the reactive current reference is reduced based on $i_{dref0}$, the reverse search is continued until the torque-current ratio does not increase, and the reactive current reference value under this condition ($i_{dref0}$−mΔI, and m is a certain positive integer) is determined as the optimal reactive current reference value.

It is noted that in an actual search process, the above search modes may be performed in combination, and the search modes may involve "forward" and "reverse" processes; from the perspective of symbolic-graphic combination, under a condition that ΔI is gradually added, reactive current reference values may have a monotonically increasing curve, and under a condition that ΔI is gradually subtracted, the reactive current reference values may have a monotonically decreasing curve, so that the reactive current reference value curve corresponding to the whole search process may have a peak and a trough, and thus the search modes may be defined as "search by using the hill-climbing method".

In addition, since a control duration of the permanent magnet generator includes a plurality of control periods, as described above, since the main control instructions (for example, including the control parameters, the torque command values, and the like) sent by the wind turbine main controller to the permanent magnet generator change in different control periods, the corresponding active current reference initial values and the corresponding reactive current reference initial values calculated according to the different control periods may be different.

Accordingly, searching the optimal active current reference value and the optimal reactive current reference value in the current control period by using the step S120 may further include:

comparing the determined active current reference initial value and the determined reactive current reference initial value with the optimal active current reference value and the optimal reactive current reference value searched in a previous control period respectively; under a condition that the comparison result of the active currents is consistent and the comparison result of the reactive currents is consistent, using the optimal active current reference value and the optimal reactive current reference value searched in the previous control period as the optimal active current reference value and the optimal reactive current reference value in the current control period; under a condition that any one of the comparison results of the two kinds of currents is inconsistent, searching, based on the determined active current reference initial value and the determined reactive current reference initial value, the optimal active current reference value and the optimal reactive current reference value in the current control period.

As described above, "the active current reference initial value and the reactive current reference initial value" in the current control period are compared with "the optimal active current reference value and the optimal reactive current reference value" in the previous control period respectively, and under a condition that the result of the comparing is consistency, "the optimal active current reference value and the optimal reactive current reference value" in the previous control period are directly used to control the permanent magnet generator to operate, thereby omitting a step of "re-searching" to improve a control efficiency of the control method.

The control method of the permanent magnet generator according to the present disclosure is described below with reference to the disclosure example of FIG. 3.

Figure 3:
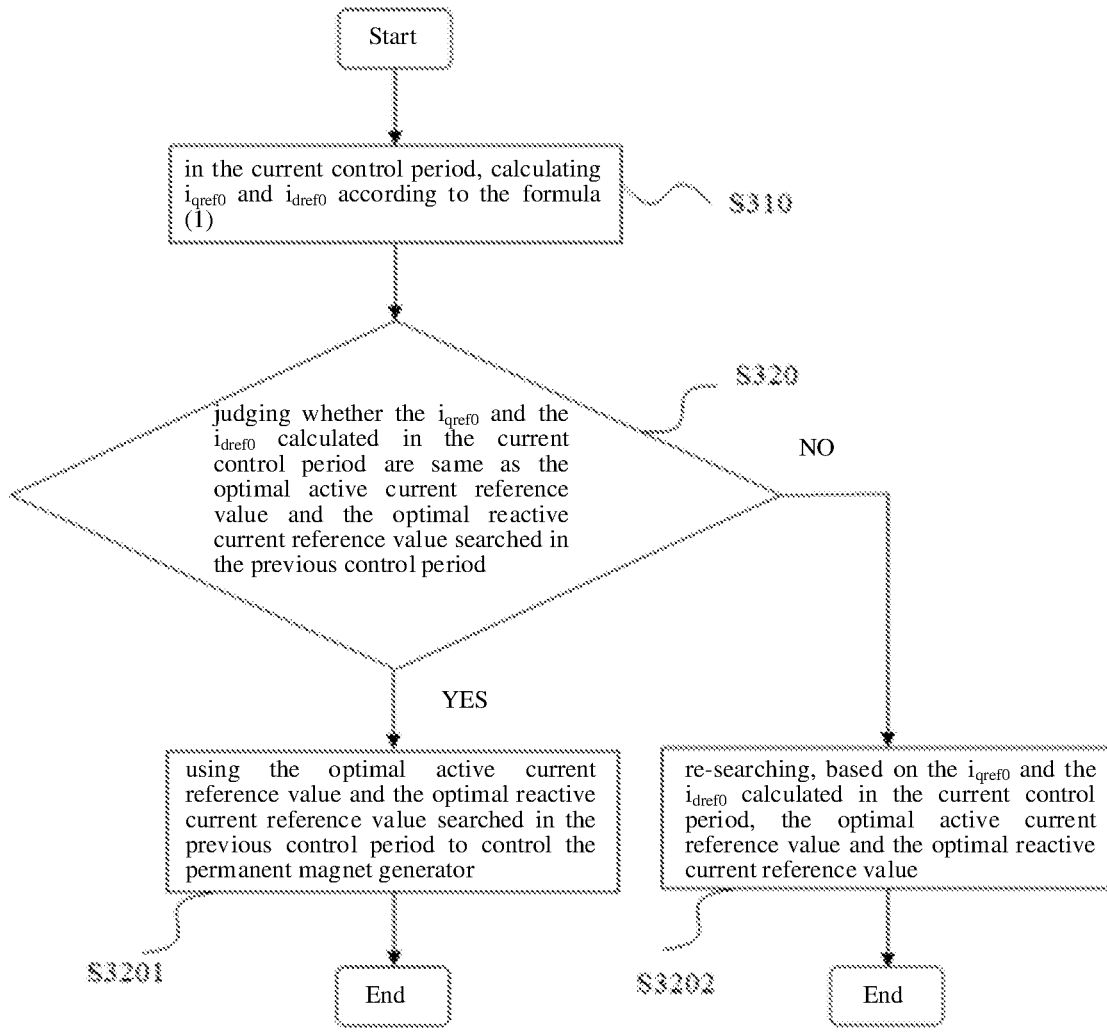
FIG. 3 is a schematic diagram showing one disclosure example of a control method of a permanent magnet generator according to an exemplary embodiment of the present disclosure.

With reference to FIG. 3, in step S310, in the current control period, the active current reference initial value $i_{qref0}$ and the reactive current reference initial value $i_{dref0}$ are calculated according to the formula (1).

In step S320, it is judged whether the active current reference initial value $i_{qref0}$ and the reactive current reference initial value $i_{dref0}$ calculated in the current control period are same as the optimal active current reference value and the optimal reactive current reference value searched in the previous control period.

In step S3201, in response that the active current reference initial value and the reactive current reference initial value calculated in the current control period are the same as the optimal active current reference value and the optimal reactive current reference value searched in the previous control period, the optimal active current reference value and the optimal reactive current reference value searched in the previous control period are used to control the permanent magnet generator to operate, thereby omitting the step of "re-searching" to improve a control efficiency of the control method;

In step S3202, in response that the active current reference initial value and the reactive current reference initial value calculated in the current control period are not the same as the optimal active current reference value and the optimal reactive current reference value searched in the previous control period, the optimal active current reference value and the optimal reactive current reference value in the current control period may be searched.

In summary, with the technical solution provided by the present disclosure, the active current reference initial value and the reactive current reference initial value are calculated in the current control period, and then the optimal active current reference value and the optimal reactive current reference value are determined with a searching target of maximizing a corresponding torque-current ratio and based on an on-line search (for example, a search by using a hill-climbing method), so as to correct a formula-calculated value error caused by a parameter deviation, that is, to avoid an effect of parameter variations of the permanent magnet generator on maximum torque per ampere control, thereby achieving precise optimal torque per ampere control. Based on the determined maximum torque-current ratio, a maximum torque output under a minimum current may be achieved to reduce a loss of a transmission system and to improve an efficiency of the system; and heat generated when the generator and a converter operate may be reduced, and a working load of heat dissipation devices of the generator and the converter may be reduced, thereby improving a lifespan when they operate. In addition, the technical solution of the present disclosure is mainly achieved by optimizing control of software without adding any hardware device, thereby avoiding an increase in cost, and improving applicability of the solution.

Figure 2:
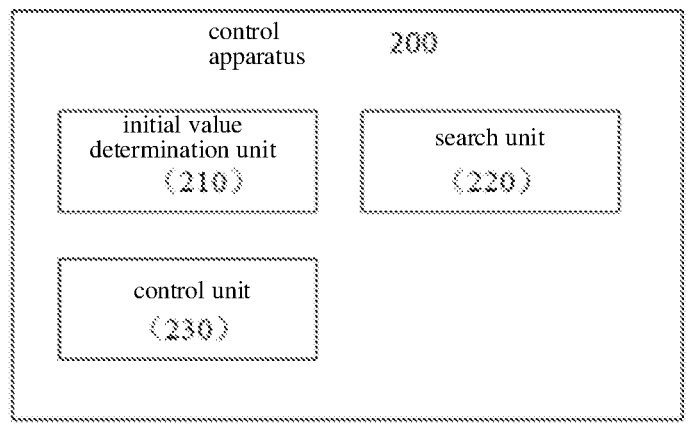
FIG. 2 is a block diagram showing a control apparatus of a permanent magnet generator according to an exemplary embodiment of the present disclosure.

FIG. 2 of the embodiment is a block diagram showing a control apparatus of a permanent magnet generator according to an exemplary embodiment of the present disclosure. Since the control method shown in FIG. 1 is used under a condition that the control apparatus is used to control the permanent magnet generator to operate, specific implementations of the control apparatus may be referred to the implementation of the control method, and a repeated part thereof will not be described in detail.

With reference to FIG. 2, the control apparatus 200 includes an initial value determination unit 210, a search unit 220, and a control unit 230 which are communicatively coupled to each other.

The initial value determination unit 210 is configured to determine the active current reference initial value and the reactive current reference initial value of the permanent magnet generator in the current control period; the search unit 220 is configured to search, based on the active current reference initial value and the reactive current reference initial value, and with the target of maximizing the torque-current ratio in the current control period, the optimal active current reference value and the optimal reactive current reference value in the current control period; the control unit 230 is configured to control, based on the optimal active current reference value and the optimal reactive current reference value, the permanent magnet generator to operate. The torque-current ratio is calculated based on the torque command value received by the permanent magnet generator from the wind turbine main controller and an output current value of the permanent magnet generator.

It is understood that the specific features of the present disclosure previously described with respect to the control method of the permanent magnet generator are applicable to the control apparatus of the permanent magnet generator and may be extended in a similar way, which are not described in detail for the sake of simplicity.

Specifically, the initial value determination unit 210 may acquire the control parameter sent to the permanent magnet generator by the wind turbine main controller in the current control period and the generator parameters of the permanent magnet generator, and calculate, based on the generator parameters and the control parameters, the active current reference initial value and the reactive current reference initial value.

As described above, the generator parameters include the generator flux linkage $\psi_m$, the d-axis inductance $L_d$, and the q-axis inductance $L_q$, and the control parameters include the driving current $I_s$. Accordingly, the initial value determination unit 210 may calculate, based on the generator flux linkage $\psi_m$, the d-axis inductance $L_d$, the q-axis inductance $L_q$ and the driving current $I_s$, the reactive current reference initial value, and calculate, based on the driving current $I_s$ and the reactive current reference initial value, the active current reference initial value.

In another aspect, the generator parameters include the generator flux linkage $\psi_m$, the d-axis inductance $L_d$, and the q-axis inductance $L_q$, and the control parameter includes the driving current $I_s$. Accordingly, the initial value determination unit 210 is further configured to calculate, based on the generator flux linkage $\psi_m$, the d-axis inductance $L_d$, the q-axis inductance $L_q$ and the driving current $I_s$, the current vector angle of the permanent magnet generator by the inverse cosine operation, and calculate, based on the driving current $I_s$ and the current vector angle, the active current reference initial value and the reactive current reference initial value.

The search unit 220 may search, in the current control period, the optimal active current reference value and the optimal reactive current reference value on-line by using the hill-climbing method, or may search, in the current control period, the optimal active current reference value and the optimal reactive current reference value off-line by using the table lookup method, the look-up table supporting the off-line search is obtained by performing the on-line search in advance, and the look-up table includes the optimal active current reference values and the optimal reactive current reference values corresponding to different torques, rotational speeds and/or powers.

Optionally, the search unit 220 may further keep in the current control period the active current reference initial value unchanged as the optimal active current reference value, and search, based on the reactive current reference initial value and by gradually adding or subtracting a reactive current reference value variation of a preset step size, a reactive current reference value corresponding to a maximum torque-current ratio in the current control period as the optimal reactive current reference value.

Optionally, the search unit 220 may further add the reactive current reference initial value $i_{dref0}$ and the reactive current reference value variation $\Delta I$ of the preset step size to obtain a first reactive current reference value, and determine whether a torque-current ratio corresponding to the first reactive current reference value increases after an output current of the permanent magnet generator is stable. Under a condition that the torque-current ratio corresponding to the first reactive current reference value does not increase, the reactive current reference value variation $\Delta I$ of the preset step size is subtracted from the reactive current reference initial value $i_{dref0}$ to obtain a second reactive current reference value. It is determined whether a torque-current ratio corresponding to the second reactive current reference value increases after the output current of the permanent magnet generator is stable. Under a condition that the torque-current ratio corresponding to the second reactive current reference value does not increase, the reactive current reference initial value $i_{dref0}$ is determined as the optimal reactive current reference value in the current control period.

Optionally, the search unit 220 may further add, in response to the torque-current ratio corresponding to the first reactive current reference value increasing, the first reactive current reference value and the reactive current reference value variation $\Delta I$ of the preset step size to obtain a first addition result, and update the first reactive current reference value with the first addition result. It is determined whether a torque-current ratio corresponding to the updated first reactive current reference value increases after the output current of the permanent magnet generator is stable. Under a condition that the torque-current ratio corresponding to the updated first reactive current reference value does not increase, the updated first reactive current reference value is determined as the optimal reactive current reference value. Under a condition that the torque-current ratio corresponding to the updated first reactive current reference value increases, the updated first reactive current reference value and the reactive current reference value variation $\Delta I$ of the preset step size are added to obtain a second addition result, and the first reactive current reference value is continued to be updated with the second addition result, and returning to the step of determining whether the torque-current ratio corresponding to the updated first reactive current reference value increases.

Optionally, the search unit 220 may further subtract, in response to the torque-current ratio corresponding to the second reactive current reference value increasing, the reactive current reference value variation $\Delta I$ of the preset step size from the second reactive current reference value to obtain a first subtraction result, and update the second reactive current reference value with the first subtraction result. It is determined whether a torque-current ratio corresponding to the updated second reactive current reference value increases after the output current of the permanent magnet generator is stable. Under a condition that the torque-current ratio corresponding to the updated second reactive current reference value does not increase, the updated second reactive current reference value is determined as the optimal reactive current reference value. Under a condition that the torque-current ratio corresponding to the updated second reactive current reference value increases, the reactive current reference value variation $\Delta I$ of the preset step size is subtracted from the updated second reactive current reference value to obtain a second subtraction result, and the second reactive current reference value is continued to be updated with the second subtraction result, and returning to the step of determining whether the torque-current ratio corresponding to the updated second reactive current reference value increases.

Optionally, the search unit 220 may further compare the determined active current reference initial value and the determined reactive current reference initial value with an optimal active current reference value and an optimal reactive current reference value searched in a previous control period respectively. Under a condition that a result of the comparing is consistency, the optimal active current reference value and the optimal reactive current reference value searched in the previous control period are used as the optimal active current reference value and the optimal reactive current reference value in the current control period. Under a condition that the result of the comparing is inconsistency, the optimal active current reference value and the optimal reactive current reference value in the current control period are searched based on the determined active current reference initial value and the determined reactive current reference initial value.

It is understood that various units/modules in the control apparatus of the permanent magnet generator according to the exemplary embodiments of the present disclosure may be implemented as hardware components and/or software components. According to the processing performed by the various units/modules defined, those skilled in the art would have been able to use, for example, a field programmable gate array (FPGA) or an disclosure specific integrated circuit (ASIC) to achieve the various units/modules.

According to yet another aspect of an exemplary embodiment of the present disclosure, a computer-readable storage medium storing computer programs, in which these computer programs, when executed by a processor, implement the control method of the present disclosure.

Specifically, the control method according to the exemplary embodiments of the present disclosure may be programmed as computer programs, code segments, instructions, or any combination thereof, and may be recorded, stored, or fixed in or on one or more non-transitory computer-readable storage media. The computer readable storage medium is any data storage apparatus that may store data read by a computer system. Examples of the computer readable storage medium include: a read-only memory, a random-access memory, an optical read-only disk, a magnetic tape, a floppy disk, an optical data storage apparatus, and a carrier wave (such as data transmission through the Internet via wired or wireless transmission paths).

According to yet another aspect of an exemplary embodiment of the present disclosure, an electronic device is provided, and the electronic device includes at least one processor, at least one memory storing computer-executable instructions, in which the computer-executable instructions, when executed by the at least one processor, cause the at least one processor to perform the control method of the present disclosure.

Specifically, the electronic device may broadly be a tablet computer, a smart phone, a smart watch, or any other electronic device having necessary computing and/or processing capabilities. In one embodiment, the electronic device may include a processor, a memory, a network interface, a communication interface which are connected by a system bus. The processor of the electronic device may be used to provide necessary computing, processing and/or control capabilities. A memory of the electronic device may include a non-volatile storage medium and an internal memory. An operating system, a computer program, and the like may be stored in or on the non-volatile storage medium. The internal memory may provide an environment for the operation of the operating system and the computer program in the non-volatile storage medium. The network interface and the communication interface of the electronic device may be used to connect to and communicate with external devices by a network.

In summary, with the technical solution provided by the present disclosure, the active current reference initial value and the reactive current reference initial value are calculated in the current control period, and then the optimal active current reference value and the optimal reactive current reference value are determined with the searching target of maximizing the corresponding torque-current ratio and based on the on-line search (for example, the search by using the hill-climbing method), so as to correct the formula-calculated value error caused by the parameter deviation, that is, to avoid the effect of parameter variations of the permanent magnet generator on maximum torque per ampere control, thereby achieving precise optimal torque per ampere control. Based on the determined maximum torque-current ratio, the maximum torque output under the minimum current may be achieved to reduce the loss of the transmission system and to improve the efficiency of the system; and the heat generated when the generator and the converter operate may be reduced, and the working load of the heat dissipation devices of the generator and the converter may be reduced, thereby improving the lifespan when they operate; in addition, the technical solution of the present disclosure is mainly achieved by optimizing the control of software without adding any hardware device, thereby avoiding the increase in cost, and improving the applicability of the solution.

Although some of the exemplary embodiments of the present disclosure have been illustrated and described, those skilled in the art will understand that modifications may be made to these embodiments without departing from the scope of the principle and the gist of the present disclosure defined by the claims and their equivalents.

What is claimed is:

1. A control method of a permanent magnet generator, wherein the control method comprises:
   determining an active current reference initial value and a reactive current reference initial value of the permanent magnet generator in the current control period;
   searching, based on the active current reference initial value and the reactive current reference initial value, and with a target of maximizing a torque-current ratio in the current control period, an optimal active current reference value and an optimal reactive current reference value in the current control period; and
   controlling, based on the optimal active current reference value and the optimal reactive current reference value, the permanent magnet generator to operate;
   wherein the torque-current ratio is calculated based on a torque command value received by the permanent magnet generator from a wind turbine main controller and an output current value of the permanent magnet generator.

2. The control method according to claim 1, wherein determining the active current reference initial value and the reactive current reference initial value of the permanent magnet generator in the current control period comprises:
   acquiring control parameters sent to the permanent magnet generator by the wind turbine main controller in the current control period and generator parameters of the permanent magnet generator; and
   calculating, based on the generator parameters and the control parameters, the active current reference initial value and the reactive current reference initial value.

3. The control method according to claim 2, wherein the generator parameters comprise a generator flux linkage, a d-axis inductance and a q-axis inductance, and the control parameters comprise a driving current;
   wherein calculating, based on the generator parameters and the control parameters, the active current reference initial value and the reactive current reference initial value comprises:

calculating, based on the generator flux linkage, the d-axis inductance, the q-axis inductance and the driving current, the reactive current reference initial value; and calculating, based on the driving current and the reactive current reference initial value, the active current reference initial value.

4. The control method according to claim 2, wherein the generator parameters comprise a generator flux linkage, a d-axis inductance and a q-axis inductance, and the control parameters comprise a driving current;

wherein calculating, based on the generator parameters and the control parameters of the permanent magnet generator, the active current reference initial value and the reactive current reference initial value comprises:

calculating, based on the generator flux linkage, the d-axis inductance, the q-axis inductance and the driving current, a current vector angle of the permanent magnet generator by an inverse cosine operation; and calculating, based on the driving current and the current vector angle, the active current reference initial value and the reactive current reference initial value.

5. The control method according to claim 1, wherein searching, based on the active current reference initial value and the reactive current reference initial value, and with the target of maximizing the torque-current ratio in the current control period, the optimal active current reference value and the optimal reactive current reference value in the current control period comprises:

searching, in the current control period, the optimal active current reference value and the optimal reactive current reference value on-line by using a hill-climbing method, or searching, in the current control period, the optimal active current reference value and the optimal reactive current reference value off-line by using a table lookup method;

wherein a look-up table supporting an off-line search is obtained by performing an on-line search in advance, and the look-up table comprises optimal active current reference values and optimal reactive current reference values corresponding to different torques, rotational speeds and/or powers.

6. The control method according to claim 5, wherein searching the optimal active current reference value and the optimal reactive current reference value on-line by using the hill-climbing method comprises:

keeping, in the current control period, the active current reference initial value unchanged as the optimal active current reference value; and searching, based on the reactive current reference initial value and by gradually adding or subtracting a reactive current reference value variation of a preset step size, a reactive current reference value corresponding to a maximum torque-current ratio in the current control period as the optimal reactive current reference value.

7. The control method according to claim 6, wherein searching, based on the reactive current reference initial value and by gradually adding or subtracting the reactive current reference value variation of the preset step size, the reactive current reference value corresponding to the maximum torque-current ratio in the current control period as the optimal reactive current reference value comprises:

adding the reactive current reference initial value and the reactive current reference value variation of the preset step size to obtain a first reactive current reference value;

determining whether a torque-current ratio corresponding to the first reactive current reference value increases after an output current of the permanent magnet generator is stable;

subtracting, in response to the torque-current ratio corresponding to the first reactive current reference value not increasing, the reactive current reference value variation of the preset step size from the reactive current reference initial value to obtain a second reactive current reference value;

determining whether a torque-current ratio corresponding to the second reactive current reference value increases after the output current of the permanent magnet generator is stable; and determining, in response to the torque-current ratio corresponding to the second reactive current reference value not increasing, the reactive current reference initial value as the optimal reactive current reference value in the current control period.

8. The control method according to claim 7, wherein searching, based on the reactive current reference initial value and by gradually adding or subtracting the reactive current reference value variation of the preset step size, the reactive current reference value corresponding to the maximum torque-current ratio in the current control period as the optimal reactive current reference value further comprises:

adding, in response to the torque-current ratio corresponding to the first reactive current reference value increasing, the first reactive current reference value and the reactive current reference value variation of the preset step size to obtain a first addition result, and updating the first reactive current reference value with the first addition result;

determining whether a torque-current ratio corresponding to the updated first reactive current reference value increases after the output current of the permanent magnet generator is stable;

determining, in response to the torque-current ratio corresponding to the updated first reactive current reference value not increasing, the updated first reactive current reference value as the optimal reactive current reference value;

adding, in response to the torque-current ratio corresponding to the updated first reactive current reference value increasing, the updated first reactive current reference value and the reactive current reference value variation of the preset step size to obtain a second addition result, and continuing to update the first reactive current reference value with the second addition result, and then returning to the step of determining whether the torque-current ratio corresponding to the updated first reactive current reference value increases.

9. The control method according to claim 7, wherein searching, based on the reactive current reference initial value and by gradually adding or subtracting the reactive current reference value variation of the preset step size, the reactive current reference value corresponding to the maximum torque-current ratio in the current control period as the optimal reactive current reference value further comprises:

subtracting, in response to the torque-current ratio corresponding to the second reactive current reference value increasing, the reactive current reference value variation of the preset step size from the second reactive current reference value to obtain a first subtraction result, and updating the second reactive current reference value with the first subtraction result;

determining whether a torque-current ratio corresponding to the updated second reactive current reference value increases after the output current of the permanent magnet generator is stable;

determining, in response to the torque-current ratio corresponding to the updated second reactive current reference value not increasing, the updated second reactive current reference value as the optimal reactive current reference value;

subtracting, in response to the torque-current ratio corresponding to the updated second reactive current reference value increasing, the reactive current reference value variation of the preset step size from the updated second reactive current reference value to obtain a second subtraction result, and continuing to update the second reactive current reference value with the second subtraction result, and then returning to the step of determining whether the torque-current ratio corresponding to the updated second reactive current reference value increases.

10. The control method according to claim 1, wherein searching, based on the active current reference initial value and the reactive current reference initial value, and with the target of maximizing the torque-current ratio in the current control period, the optimal active current reference value and the optimal reactive current reference value in the current control period further comprises:

comparing the determined active current reference initial value and the determined reactive current reference initial value with an optimal active current reference value and an optimal reactive current reference value searched in a previous control period respectively;

in response to a result of the comparing being consistency, using the optimal active current reference value and the optimal reactive current reference value searched in the previous control period as the optimal active current reference value and the optimal reactive current reference value in the current control period; and in response to the result of the comparing being inconsistency, searching, based on the determined active current reference initial value and the determined reactive current reference initial value, the optimal active current reference value and the optimal reactive current reference value in the current control period.

11. A computer-readable storage medium storing computer programs, wherein the computer programs, when executed by a processor, implement the control method of the permanent magnet generator according to claim 1.

12. An electronic device, comprising:
at least one processor;
at least one memory storing computer-executable instructions,
wherein the computer-executable instructions, when executed by the at least one processor, cause the at least one processor to perform the control method of the permanent magnet generator according to claim 1.

13. A control apparatus of a permanent magnet generator, wherein the control apparatus comprises:
an initial value determination unit configured to determine an active current reference initial value and a reactive current reference initial value of the permanent magnet generator in the current control period;
a search unit configured to search, based on the active current reference initial value and the reactive current reference initial value, and with a target of maximizing a torque-current ratio in the current control period, an optimal active current reference value and an optimal reactive current reference value in the current control period; and
a control unit configured to control, based on the optimal active current reference value and the optimal reactive current reference value, the permanent magnet generator to operate;
wherein the torque-current ratio is calculated based on a torque command value received by the permanent magnet generator from a wind turbine main controller and an output current value of the permanent magnet generator.

* * * * *